Dec. 30, 1930.    E. D. MOORE ET AL    1,786,720

CURRENT COLLECTOR SUPPORT

Filed Aug. 28, 1929

Witness:
H. J. Stromberger

Inventor
EDGAR D. MOORE
FRED R. DIPPMAN
By
Attorney

Patented Dec. 30, 1930

1,786,720

UNITED STATES PATENT OFFICE

EDGAR D. MOORE AND FRED R. DIPPMAN, OF MANSFIELD, OHIO, ASSIGNORS TO THE OHIO BRASS COMPANY, OF MANSFIELD, OHIO, A CORPORATION OF NEW JERSEY

CURRENT-COLLECTOR SUPPORT

Application filed August 28, 1929. Serial No. 389,058.

Our invention relates to a device to be interposed between a current collector support and a trolley pole to absorb shocks and sound vibrations due to the movement of the current collector along the trolley wire.

It is found that the life of a current collector and trolley wire can be materially affected by the contact between the current collector and trolley wire, and this can be brought about by making the current collector yieldable relative to the trolley pole.

Sound vibrations set up between the trolley wheel and trolley wire are transmitted to the car roof as there is a direct metallic connection between the wire and car roof, and if this connection can be broken by a resilient material such as rubber, the sound vibrations are absorbed, thereby and very few reach the car roof.

It is our object to accomplish the benefits set forth above and the same is brought about through the new and novel construction, combination and relation of the various parts herein described and shown in the accompanying drawing.

In the drawing:—

Figure 1:
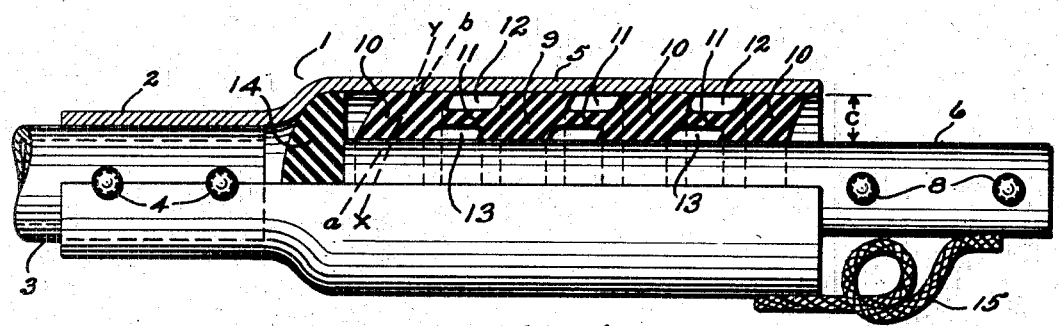
Fig. 1 is a side view of our invention in partial section.

In our preferred embodiment we have a member 1 having a tubular end 2 adapted to receive the end of a trolley pole 3 and held thereto by transverse rivets 4. The end 2 may be reduced in diameter so as to be inserted within the trolley pole 3 if desired. Also the end 2 may be made solid. The member 1 is provided with the enlarged tubular or socket portion 5.

Figure 2:
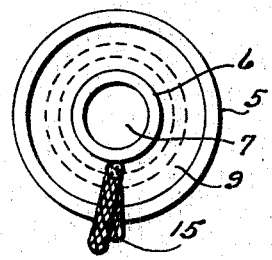
Fig. 2 is an end view of Fig. 1.
Figure 4:
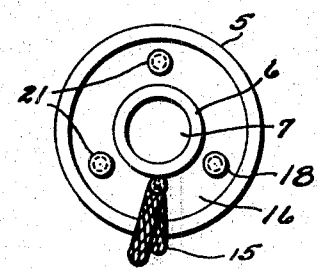
Fig. 4 is an end view of Fig. 3.

The device is also provided with a second member 6 which is shown as tubular (see Fig. 2) but which may be also solid. To the member 6 may be attached a support, known as a harp, for the current collector and well known to those skilled in the art. The support may have a straight shank which is inserted within the passage 7 of the member 6 and secured thereto by rivets 8. The member 6 may be made solid and its end inserted in a tubular portion of the support or harp. These are modifications which will be readily appreciated by those skilled in the art. The member 6 projects inwardly and outwardly from the member 5 and has its axis coinciding with that of the member 5 and in substantial alinement with that of the trolley pole 3.

The members 5 and 6 are spaced apart and held out of direct contact by means of a specially formed longitudinal sleeve 9 of resilient or elastic rubber, or other suitable yielding material. The member 5 is shown as possessing a plurality of struts 10 alternated and connected by web members 11, the members 10 and 11 being formed integrally and producing the annular grooves 12 and 13.

In forming the member 9, the grooves 12 and 13 may be produced at the time of molding or may be cut therein. The outside diameter of the member 9 is somewhat greater than the inside diameter of the member 5, and the inside diameter of the member 9 is somewhat smaller than the outside diameter of the member 6. This will require a distortion of the member 9 in positioning it between the metal parts and will therefore tend to increase the friction between the member 9 and each of the metal parts such that if it is attempted to draw the member 6 out of its normal position, the tendency will be for the friction to resist such action, but if the force is made sufficiently great, the strut member 10 will tend to straighten up between the metal members, thereby increasing the friction between the members 9 and the metal parts and thereby more strongly resisting the removal of the member 6.

The webs 11 are made relatively thin and yieldable and will therefore permit the straightening up action of the strut portions 10. The result is a stronger wedging action between the member 9 and the metal parts resisting the operation of the metal parts in a longitudinal direction as the operating force tends to increase.

It will, of course, be recognized that the member 9 must be made of a yielding but somewhat stiff material and such a material can easily be secured in rubber as the art of compounding rubbers to secure various results is well known.

Positioned between the end face of the member 6 and the member 1 is a cushion member 14 which prevents the member 6 from being pushed inwardly and in contact with the pole 3 or member 1.

In assembling the parts, the member 14 is first positioned in place and the member 6 is then positioned within the member 9 and then the member 9, together with the member 6, is positioned within the portion 5 of the member 1. We do not polish the surfaces of the members in contact with the member 9, but we thoroughly clean the surfaces as by means of an acid or sand bath.

Having assembled the parts, if force is applied to the parts 1 and 6 tending to operate them longitudinally, the strut members 10, which normally have a position indicated by the line $a-b$, will tend to assume a position indicated by the line $x-y$.

In order to electrically connect the parts together we employ a shunt member 15 welded or brazed or soldered to the parts 1 and 6 and formed out of very flexible copper which does not tend to conduct sound vibrations.

Figure 3:
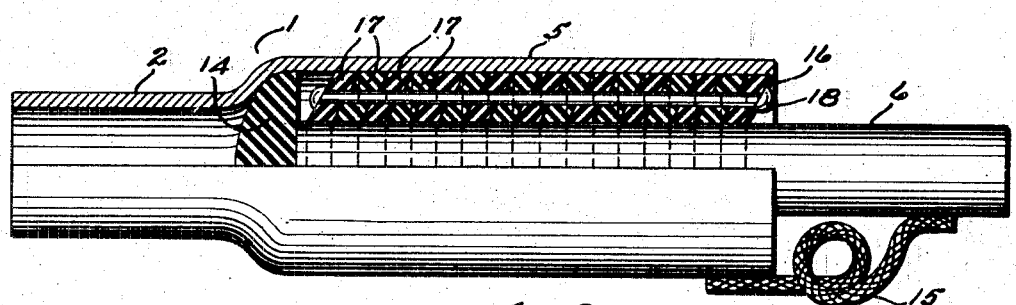
Fig. 3 is a modification of Fig. 1 and is a side view of our modified form shown in partial section.

In the modified form shown in Fig. 3 we still have the outer and inner metal parts 1 and 6 and the member 14, but we employ a modified form 16 of the member 9. The member 16 is made up of a plurality of conically shaped washers 17 which are held in a somewhat relative position by one or more through pins 18.

It will be noted that the operation of this device is similar to that shown in Fig. 1 and when force is applied to the members 2 and 6 to operate them, the washers 17 will tend to assume a position at right angles to the axis of the members 1 and 6, the same as the strut member 10 in Fig. 1. The members 17 are also made of a yieldable but somewhat stiff material.

Figure 5:
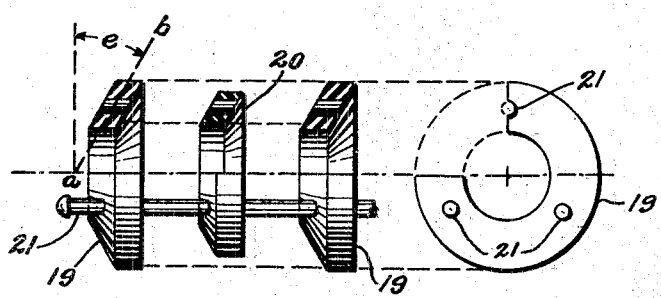
Fig. 5 shows a modification of the resilient insert between the metal parts.

In Fig. 5 we have shown a modification which may be said to be a modified form of the resilient members in Figs. 1 and 3 in that it is made up of a plurality of washers as in the case of Fig. 3, but the strut members are spaced apart as in Fig. 1. The strut members 19 are of conically shaped washers of yieldable material with an interposed conically shaped washer 20 which has a greater inner diameter than the member 6 and a lesser diameter than the portion 5 of the member 1. These members 19 and 20 are strung upon one or more pins 21 and thus act as a unit, as in the case of the similar parts in Figs. 1 and 3.

The angle "$e$" of the strut members may be varied which will give various effects in wedging the metal parts together with a given composition in the strut members, therefore by varying the angle "$e$", the composition of the strut members in the outer and inner diameters of the strut members, varying results can be secured to meet the requirements.

In the forms shown in Figs. 3 and 5, the strut members may be produced of leather, if desired, as leather is of a yielding and somewhat resistant character and will also absorb sound vibrations.

Modifications will suggest themselves to those skilled in the art, therefore we wish to be limited only by our claims.

We claim:—

1. A trolley device comprising outer and inner members having lapping portions with a common longitudinal axis and out of direct engagement, means to hold the members in the relation to each other set forth above and prevent their longitudinal separation, the said means made of a yieldable material and tending to shift its position relative to the said members to offer increasing resistance to separation of the members as the separating force increases.

2. A trolley device comprising elongated outer and inner members having lapping portions and a common longitudinal axis, means to hold the members in a predetermined relation and out of direct contact with each other, the means comprising spaced strut elements interposed between the members and having frictional engagement with the members, which increases when it is attempted to separate the members.

3. A trolley device comprising elongated outer and inner members having lapping portions and a common longitudinal axis, means to hold the members in a predetermined relation and out of direct contact with each other, the means comprising spaced strut elements interposed between the members and having frictional engagement with the members.

4. A trolley device comprising outer and inner members having concentric portions and aligned axes, means to hold the members out of direct contact and against separation in the axial direction, the means comprising a plurality of spaced strut elements of resilient material interposed between the members and having frictional engagement with each member, and means to hold the struts in relative relation.

5. A trolley device comprising outer and inner members having concentric portions and aligned axes, means to hold the members out of direct contact and against separation in the axial direction, the means comprising a plurality of strut elements of resilient material interposed between the members and having frictional engagement with each member.

6. A trolley device comprising outer and inner members having concentric portions, means of resilient material to hold the members out of direct contact, comprising a plurality of conically shaped washer like elements interposed between the members and having frictional engagement with the members.

7. A trolley device comprising outer and inner members having concentric portions, means of resilient material to hold the members out of direct contact, comprising a plurality of conically shaped washer-like elements interposed between the members and having frictional engagement with the members and opposing forced separation of the members with increasing resistance.

8. A trolley device comprising outer and inner members having lapping concentric portions, a tubular element of resilient material to hold the members out of direct contact interposed between the members and having a greater outer diameter than the inner diameter of the outer member and having a less inner diameter than the outer diameter of the inner member, means to secure the members to a trolley pole and current collector support respectively, and means to electrically connect the members.

9. A trolley device comprising outer and inner members having lapping concentric portions, a tubular element of resilient material to hold the members out of direct contact interposed between the members and having a greater outer diameter than the inner diameter of the outer member and having a less inner diameter than the outer diameter of the inner member, means to secure the members to a trolley pole and current collector support respectively, and other means to hold the members out of direct contact electrically.

10. A trolley device comprising a member having a tubular portion, a second member having a lapping relation with the tubular portion for a part of its length, one member arranged for attachment to a pole and the other member for attachment to a support for a current collector, means to hold the parts out of direct contact and resist separation of the members and comprising a plurality of spaced conically shaped washers of resilient rubber surrounding the inner member and having frictional engagement with both members to resist their separation, and means electrically connecting the members.

In testimony whereof we affix our signatures.

EDGAR D. MOORE.
FRED R. DIPPMAN.